(12) United States Patent
Horvitz

(10) Patent No.: US 7,643,985 B2
(45) Date of Patent: Jan. 5, 2010

(54) CONTEXT-SENSITIVE COMMUNICATION AND TRANSLATION METHODS FOR ENHANCED INTERACTIONS AND UNDERSTANDING AMONG SPEAKERS OF DIFFERENT LANGUAGES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 11/167,414

(22) Filed: Jun. 27, 2005

(65) Prior Publication Data

US 2006/0293893 A1    Dec. 28, 2006

(51) Int. Cl.
*G06F 17/28* (2006.01)
*G10L 15/06* (2006.01)
*G10L 15/18* (2006.01)
*G10L 21/00* (2006.01)

(52) U.S. Cl. .................. 704/2; 704/244; 704/257; 704/277

(58) Field of Classification Search ................ None
See application file for complete search history.

(56) References Cited

U.S. PATENT DOCUMENTS

| 4,509,137 | A | * | 4/1985 | Yoshida ............ 704/7 |
| 5,493,692 | A | | 2/1996 | Theimer et al. |
| 5,544,321 | A | | 8/1996 | Theimer et al. |
| 5,555,376 | A | | 9/1996 | Theimer et al. |
| 5,603,054 | A | | 2/1997 | Theimer et al. |
| 5,611,050 | A | | 3/1997 | Theimer et al. |
| 5,812,865 | A | | 9/1998 | Theimer et al. |

(Continued)

FOREIGN PATENT DOCUMENTS

WO     9800787     1/1998

(Continued)

OTHER PUBLICATIONS

Lin et al., "A distributed architecture for cooperative spoken dialog agents with coherent dialog state and history", in Proc. ASRU-99, Keystone CO.*

(Continued)

*Primary Examiner*—David R Hudspeth
*Assistant Examiner*—Brian L Albertalli
(74) *Attorney, Agent, or Firm*—Lee & Hayes, PLLC

(57) ABSTRACT

Architecture that interacts with a user, or users of different tongues to enhance speech translation. A recognized concept or situation is sensed and/or converged upon, and disambiguated with mixed-initiative user interaction with a device to provide simplified inferences about user communication goals in working with others who speak another language. Reasoning is applied about communication goals based on the concept or situation at the current focus of attention or the probability distribution over the likely focus of attention, and the user or user's conversational partner is provided with appropriately triaged choices and, images, text and/or speech translations for review or perception. The inferences can also process an utterance or other input from a user as part of the evidence in reasoning about a concept, situation, goals, and/or disambiguating the latter. The system's best understanding of the question, need, or intention at the crux of the communication can be echoed back to the user for confirmation. Context-sensitive focusing of recognition and information gathering components can be provided based on the listening, and can employ words recognized from prior or current user utterances to further focus the inference.

15 Claims, 18 Drawing Sheets

U.S. PATENT DOCUMENTS

| | | | |
|---|---|---|---|
| 6,249,763 B1 | 6/2001 | Minematsu | |
| 6,266,642 B1* | 7/2001 | Franz et al. | 704/277 |
| 6,438,524 B1* | 8/2002 | Shi | 704/277 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,952,665 B1* | 10/2005 | Shimomura et al. | 704/2 |
| 7,149,688 B2* | 12/2006 | Schalkwyk | 704/255 |
| 7,236,922 B2* | 6/2007 | Honda et al. | 704/2 |
| 7,415,411 B2* | 8/2008 | Reinhard et al. | 704/257 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0144832 A1* | 7/2003 | Harris | 704/10 |
| 2003/0154476 A1 | 8/2003 | Abbott, III et al. | |
| 2003/0182111 A1 | 9/2003 | Handal et al. | |
| 2004/0102957 A1 | 5/2004 | Levin | |
| 2005/0034078 A1 | 2/2005 | Abbott et al. | |

FOREIGN PATENT DOCUMENTS

| | | |
|---|---|---|
| WO | WO9818085 A1 | 4/1998 |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

International Search Report for PCT Application Serial No. US06/24848 dated Sep. 25, 2007, 2 pages.

Stallard, et al., "Design and Evaluation of a Limited Two-Way Speech Translator", BBN Technologies, Eurospeech 2003—Geneva, pp. 2221-2224.

Yamamoto, "Toward Speech Communications Beyond Language Barrier—Research of Spoken Language Translation Technologies at ATR—", Sixth International Conference on Spoken Language Processing, vol. 4, Oct 16, 2000, 6 pgs.

European Search Report for European Application No. EP 06785590, mailed on May 20, 2009, 7 pgs.

* cited by examiner

CONTEXT-SENSITIVE COMMUNICATION AND TRANSLATION METHODS FOR ENHANCED INTERACTIONS AND UNDERSTANDING AMONG SPEAKERS OF DIFFERENT LANGUAGES

BACKGROUND

The advent of global communications networks such as the Internet has served as a catalyst for the convergence of computing power and services in portable computing devices. For example, in the recent past, portable devices such as cellular telephones and personal data assistants (PDAs) have employed separate functionality for voice communications and personal information storage, respectively. Today, these functionalities can be found in a single portable device, for example, a cell phone that employs multimodal functionality via increased computing power in hardware and software. Such devices are more commonly referred to as "smartphones."

With the technological advances in handheld and portable devices, there is an ongoing and increasing need to maximize the benefit of these continually emerging technologies. Given the advances in storage and computing power of such portable wireless computing devices, they now are capable of handling many types of disparate data types such as images, video clips, audio data, and electronic organizers for managing and organizing a variety of PIM (personal information manager) data, for example. This data is typically utilized separately for specific purposes.

The Internet has also brought internationalization by bringing millions of network users into contact with one another via mobile devices (e.g., telephones), e-mail, websites, etc., some of which can provide some level of textual translation. For example, a user can select their browser to install language plug-ins which facilitate some level of textual translation from one language text to another when the user accesses a website in a foreign country. However, the world is also becoming more mobile. More and more people are traveling for business and for pleasure. This presents situations where people are now face-to-face with individuals and/or situations in a foreign country where language barriers can be a problem. For a number of multilingual mobile assistant scenarios, speech translation is a very high bar. A mechanism is needed that can exploit the increased computing power of portable devices to enhance user translation experience.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation is architecture that interacts with a user, or users of different tongues to enhance speech translation therebetween. Described herein is the notion of a recognized concept or situation is captured and/or sensed and/or converged upon, and disambiguated with mixed-initiative user interaction with a device to provide a simplification of inferences about user communication goals in working with others who speak another language. With this approach, reasoning is applied about communication goals based on the concept or situation at the current focus of attention or the probability distribution over the likely focus of attention, and the user or user's conversational partner is provided with appropriately triaged choices and, images, symbols, text and/or speech translations for review and/or perception.

The inferences can also take as input an utterance or other input from the user as part of the evidence in reasoning about a concept, situation, goals, and or disambiguating the latter. The system's best understanding or reformulation of the question, need, or intention at the crux of the communication can then be echoed back to the user for confirmation.

The inferencing by the system can provide context-sensitive focusing of recognition and information gathering components based on the listening, and can also employ words recognized from prior or current the user utterances to further focus the inference. Additionally, a graphical and/or speech recognition backchannel can be provided for user input, confirmation, and/or pointing by the person being addressed, so as to better understand answers.

The architecture facilitates identification of key contextual clues, concept(s) at focus of user attention, and user inputs and guidance to reason about a user's intentions, needs, and goals with regards to the focus of attention, and then to construct sets of candidate utterances based on the focus of attention and context. These are employed to automatically mesh into the language in appropriate spots the concept at the focus of attention—and potentially the context as well, if necessary, and then, allow a user to refine or select an utterance, text strings, and/or images to relay to a speaker of a foreign language. The mobile device can optionally provide a means for the other person to enter information or select utterances for relay responses back to the device owner.

In another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
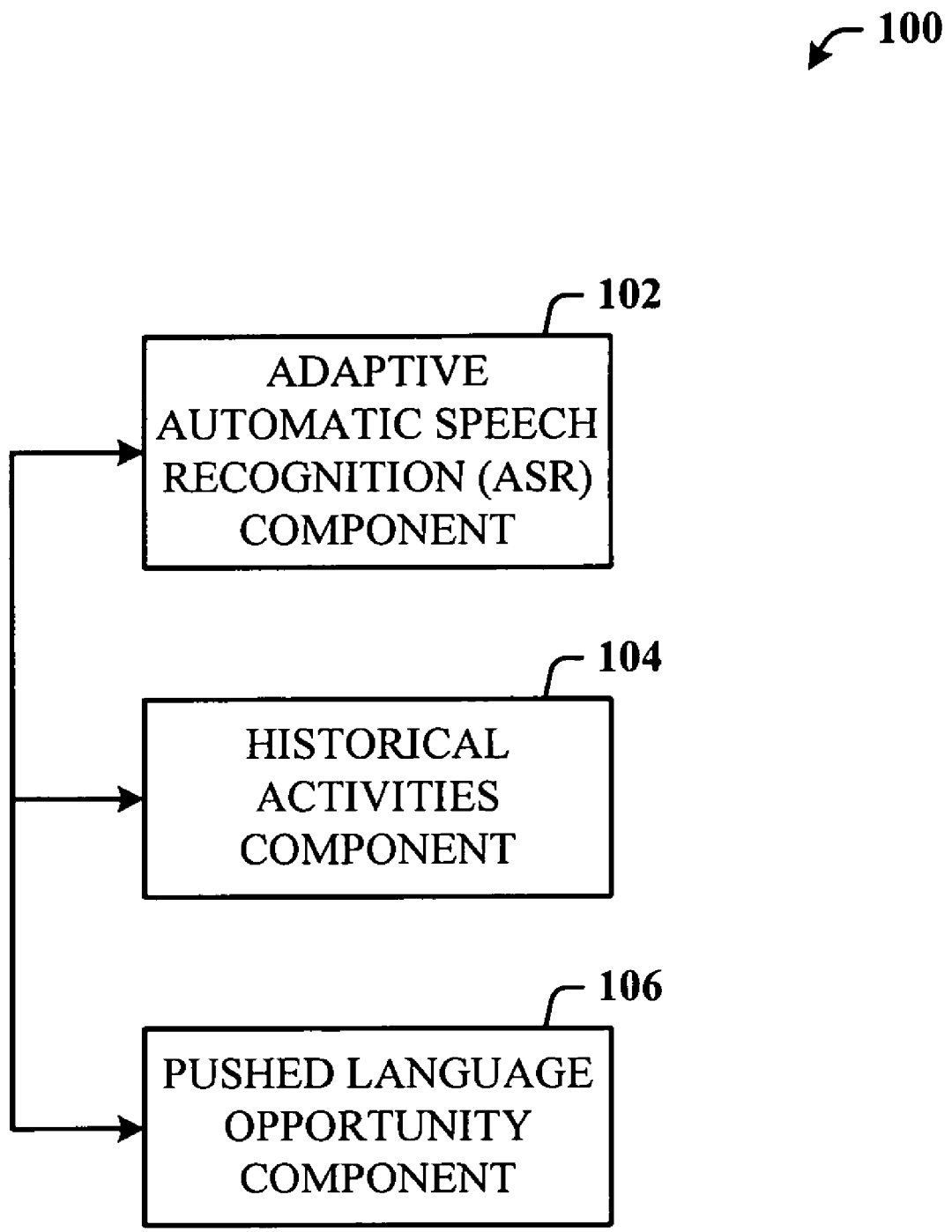
FIG. 1 illustrates a system that facilitates speech translation between users of different languages.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates speech translation between users of different languages. The disclosed innovation is architecture that interacts with a user, or users of different tongues to enhance speech translation therebetween. Described herein is the notion of a recognized concept or situation is captured and/or sensed and/or converged upon, and disambiguated with mixed-initiative user interaction with a device to provide a simplification of inferences about user communication goals in working with others who speak another language. With this approach, reasoning is applied about communication goals based on the concept or situation at the current focus of attention, the user with provided appropriately triaged choices and, text and/or speech translations are presented for perception.

The inferences can also take as input an utterance from the user as part of the evidence in reasoning about concept, situation, goals, and or disambiguating the latter. The system understanding or reformulation of the question, need, or intention can then be echoed back to the user for confirmation.

The inferencing by the system can provide a deep focusing based on the listening, and can also employ words recognized from the user's utterance to further focus the inference. Additionally, a graphical and/or speech recognition backchannel can be provided for user input, confirmation, and/or pointing by the person being addressed, so as to better understand answers.

Accordingly, the system 100 includes an adaptive automatic speech recognition (ASR) component 102 that processes sensed data of a current context and/or concept, and facilitates a speech recognition process based on the sensed data. A historical activities component 104 of the system 100 stores historical data associated with the speech recognition process. In other words, as the user interacts with the system, this interactive data is stored in a datastore as a basis for future analysis and inferencing. The system 100 can further include a language opportunity component 106 that improves the speech recognition process by pushing a training session of one or more terms to a user, which training session increases the likelihood of success when using the one or more terms during a future speech recognition process.

Figure 2:
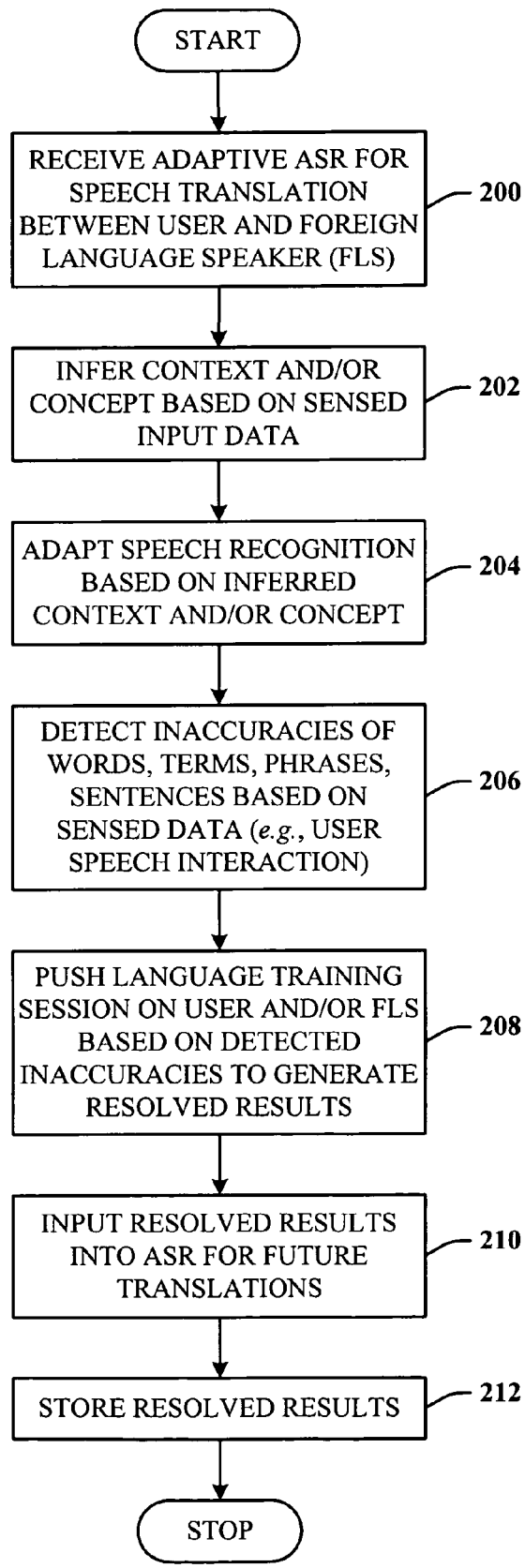
FIG. 2 illustrates a methodology of facilitating the translation of speech between users of different tongues.

FIG. 2 illustrates a methodology of facilitating the translation of speech between users of different tongues. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an adaptive ASR component is received that translates speech of a user language into a foreign language for perception by a foreign language speaker (FLS), and back from the language of the FLS into the language of the user. At 202, the system infers context and/or concept information based on sensed input data, including, but not limited to, speech communications between the user and the FLS. This can further include images, location information, audio information, gesture recognition, and search information, for example, which are described in more detail, infra. At 204, the ASR adapts the current speech recognition process based on the inferred context and/or concept information. At 206, the system detects one or more inaccuracies or ambiguities in the current speech translation interchange based on the sensed data (e.g., speech). At 208, the system pushes word and/or terms training and/or clarification on the user and/or the FLS based on the ambiguous word and/or terms that need improved processing. This training returns resolved results. At 210, the resolved results are fed back into the ASR for adaptive processing in the current speech processing session. At 212, the resolved results and aspects of the user/FLS interaction are stored in a historical datastore for future access and inference processing.

Figure 3:
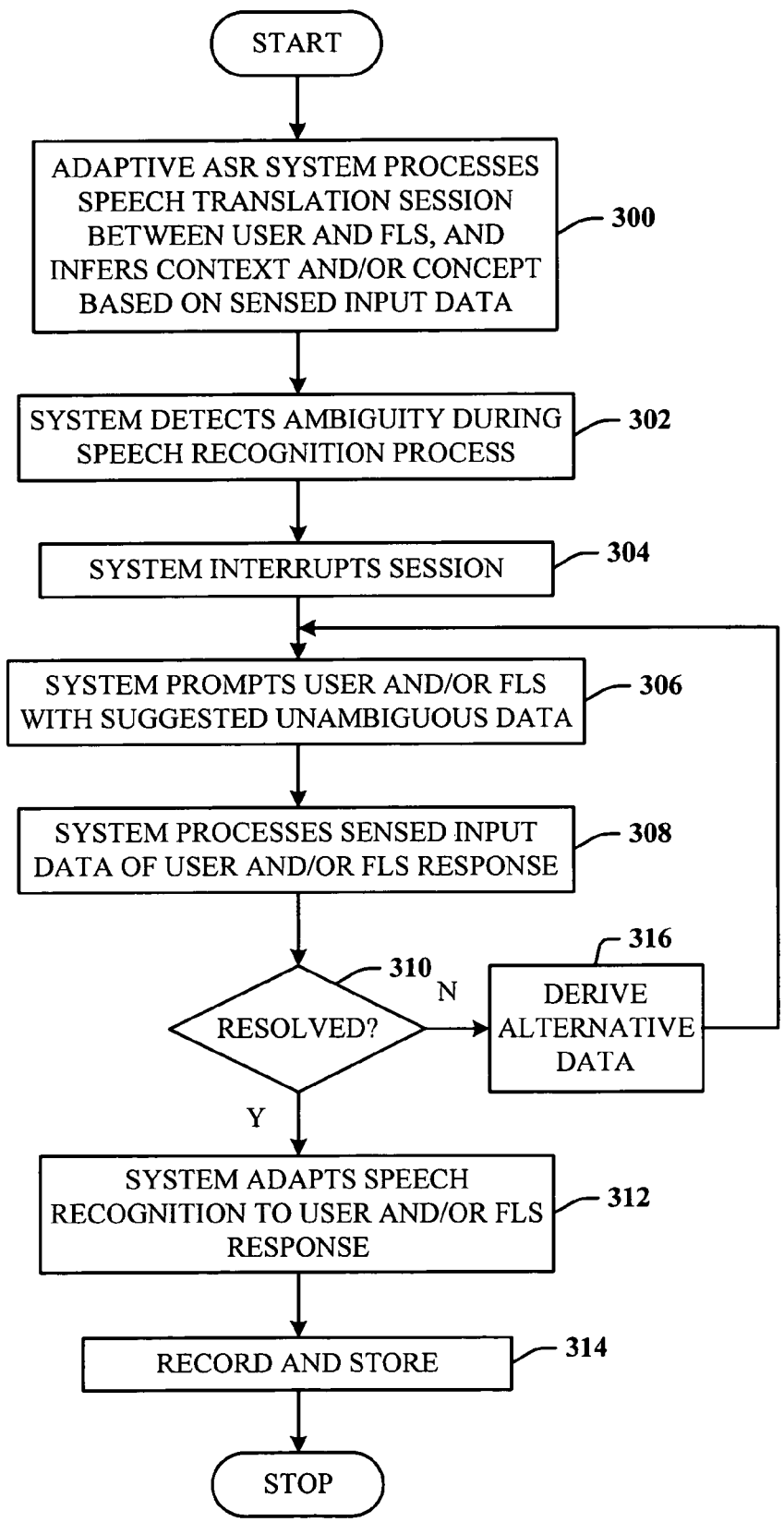
FIG. 3 illustrates a methodology of adaptive speech recognition processing in accordance with another aspect of the innovation.

FIG. 3 illustrates a methodology of adaptive speech recognition processing in accordance with another aspect of the innovation. At 300, the adaptive ASR processes a speech translation session between a user and an FLS, and infers context and/or concept based on sensed input data. At 302, the system detects an ambiguity during the speech recognition process. At 304, the system interrupts the session. At 306, the system prompts the user and/or the FLS with suggested unambiguous data. At 308, the system receives and processes sensed input data of the user and/or the FLS. This can be in the form of speech and/or other sensed input data. At 310, the system determines if the ambiguity is resolved. If so, at 312, the system adapts the speech recognition process according to user and/or FLS response. At 314, the response and/or sensed input data are stored in association with this user session, and for future access and analysis. If, at 312, the ambiguity is not resolved, progress is to 316 where the system derives an alternative unambiguous data. Flow is then back to 306 to present the alternative data to the user and/or the FLS. This system/user/FLS interaction can continue until the ambiguity is resolved.

Figure 4:
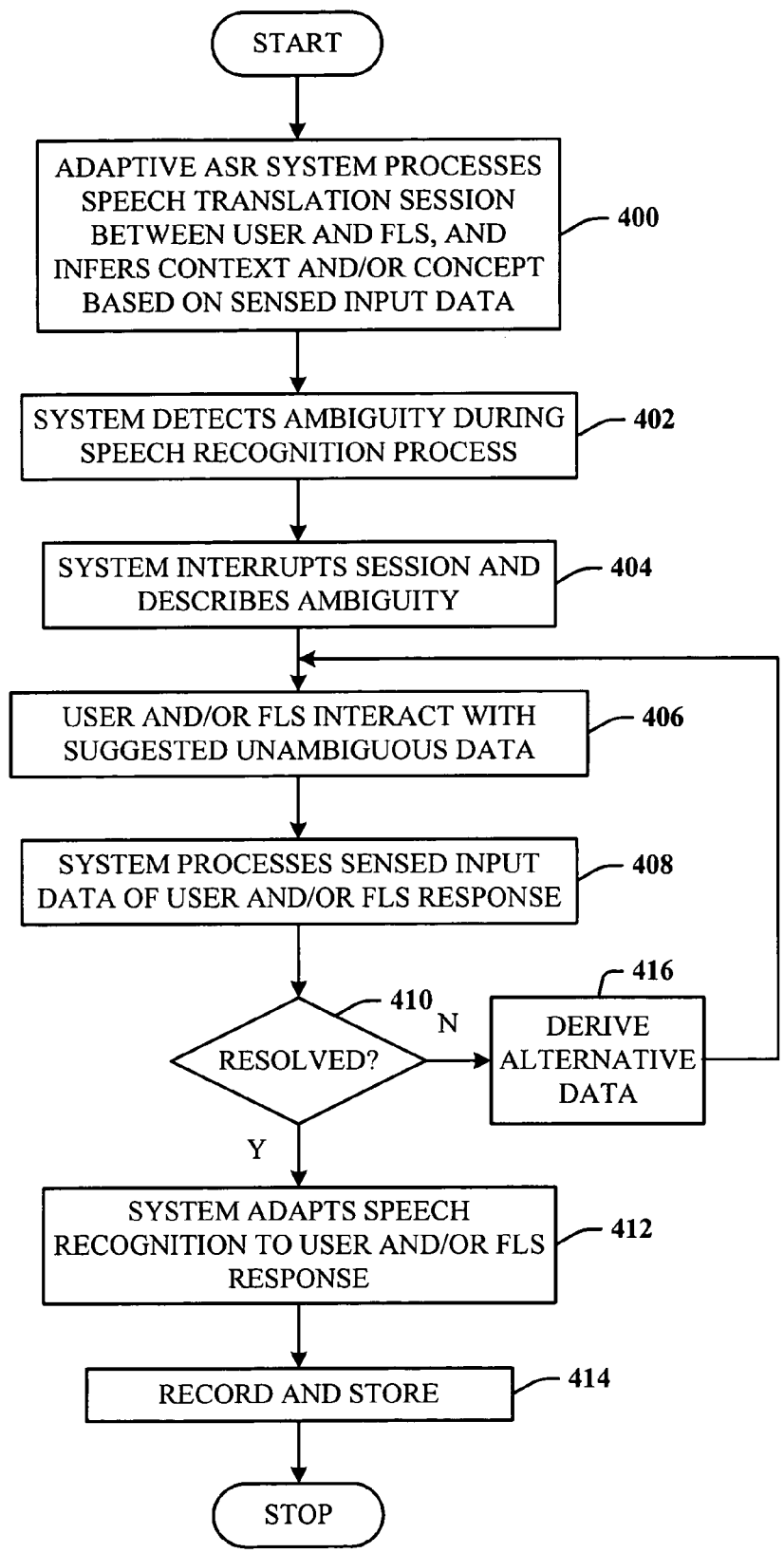
FIG. 4 illustrates an alternative methodology of adaptive speech recognition processing in accordance with another aspect of the innovation.

FIG. 4 illustrates an alternative methodology of adaptive speech recognition processing in accordance with another aspect of the innovation. At 400, the adaptive ASR processes a speech translation session between a user and an FLS, and infers context and/or concept based on sensed input data. At 402, the system detects an ambiguity during the speech recognition process. At 404, the system interrupts the session and describes to the user and/or the FLS the ambiguity. At 406, the user and/or the FLS respond with suggested unambiguous data. At 408, the system receives and processes sensed input data of the user and/or the FLS. This can be in the form of speech and/or other sensed input data. At 410, the system determines if the ambiguity is resolved. If so, at 412, the system adapts the speech recognition process according to user and/or FLS response. At 414, the response and/or sensed input data are stored in association with this user session, and for future access and analysis. If, at 412, the ambiguity is not resolved, progress is to 416 where the user and/or FLS input alternative unambiguous data. Flow is then back to 406 to present the alternative data to system for processing. This system/user/FLS interaction can continue until the ambiguity is resolved.

Figure 5:
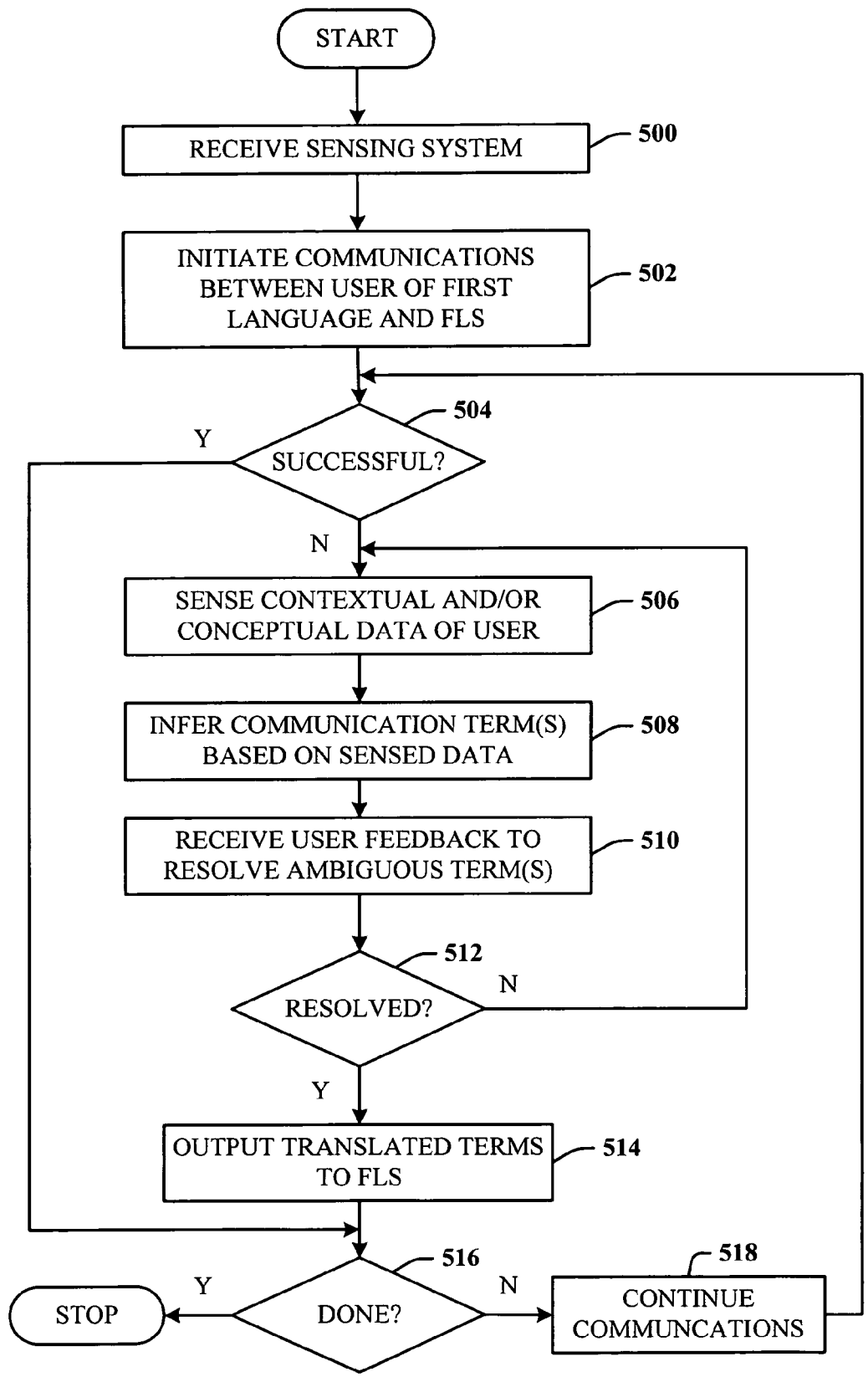
FIG. 5 illustrates a methodology of interacting with a user to confirm contextual and/or conceptual data according to an innovative aspect.

FIG. 5 illustrates a methodology of interacting with a user to confirm contextual and/or conceptual data according to an innovative aspect. At 500, a sensing system is received that can capture images, speech, sounds, etc., and perform analysis thereof to infer user context and/or concept. At 502, communications are initiated between the user the FLS. At 504, the system determines if the communications is proceeding successfully. If not, at 506, the system initiates the sensing of context and/or concept data. At 508, once the sensed input data is received therefrom, the context and/or concept can be inferred and additional communications term(s) inferred based on the sensed input data. At 510, the system can further request and/or received without request, user feedback that is utilized to resolve ambiguous the term(s). At 512, if the ambiguities are resolved, the translated term(s) are output to the FLS. If the ambiguity is not resolved, flow is back to 506 to again, perform context and/or concept sensing, and repeat ambiguity resolution. If the session is over, as checked at 516, the system stops the translation process, and awaits the next user/FLS input.

If, however, the session is not over, flow is from 516 to 518 to continue communications, with flow proceeding back to 504 to determine if the communications are successful, based on new input. If, at 504, the communications is proceeding successfully, flow is from 504 to 516 to determine if the communications have completed. In either case, flow proceeds as described above.

Figure 6:
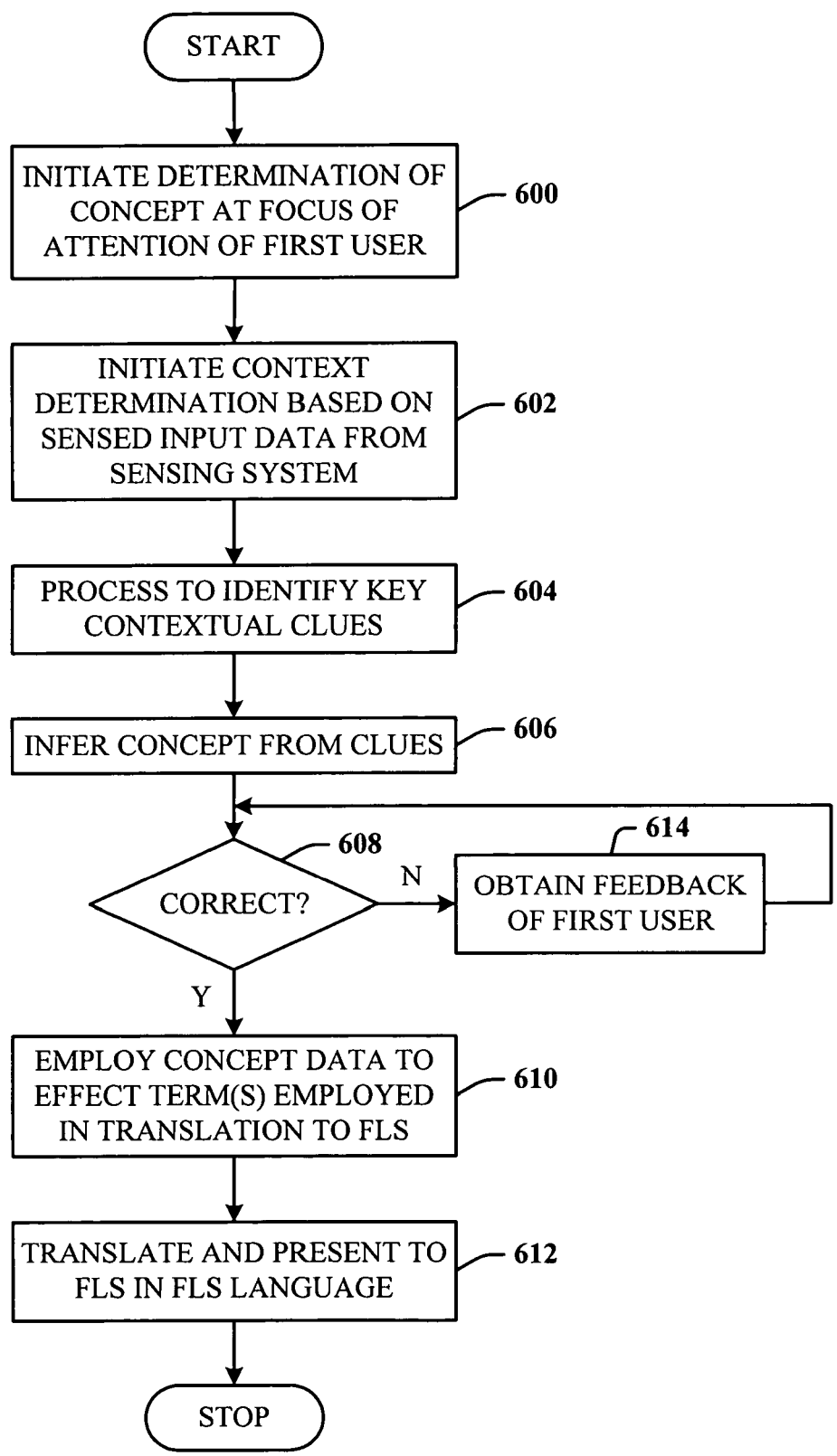
FIG. 6 illustrates a methodology of processing sensed input data for clues that improve inferences as to user concept based on context determination according to another aspect.

FIG. 6 illustrates a methodology of processing sensed input data for clues that improve inferences as to user concept based on context determination according to another aspect. At 600, the system initiates determination of user concept at the focus of user attention. This can include making inferences about the user concept based solely on user and/or FLS speech and terms thereof. At 602, the system performs context determination based on sensed data from a sensing system. This can include analysis of sensed data as to the direction of user gaze, gesture recognition, text recognition, and so on. At 604, the sensed input data is processed for clues. At 606, a concept is inferred from the contextual clues.

At 608, the system checks to determine if the inferred concept is correct. This can be performed by prompting the user directly, or transparently, by employing the inferred concept into the adaptive ASR, the results of which can indicate if the inferred concept is substantially correct. If yes, at 610, the concept data is processed to effect what term(s) are employed for communications by the adaptive ASR. At 612, the term(s) are translated and presented to the FLS. If the inferred concept is not deemed to be correct, flow is from 608 to 614 to obtain user feedback. Such feedback can impact which of the sensing system components could be employed in a subsequent round of context determination.

Figure 7:
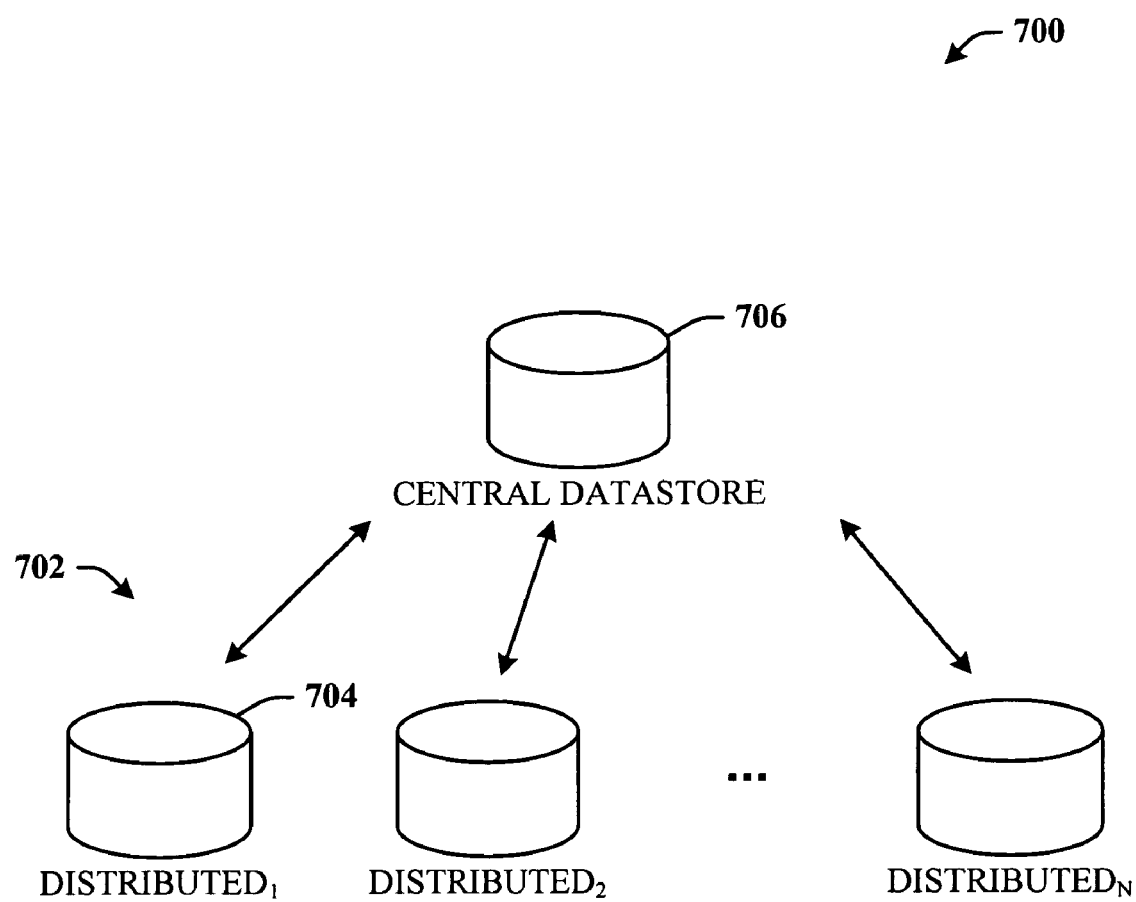
FIG. 7 illustrates a datastore network that facilitates inference processing according to an innovative aspect.

FIG. 7 illustrates a datastore network 700 that facilitates inference processing according to an innovative aspect. The user and/or FLS will typically interact at a location that is associated with one of many distributed datastores 702 (denoted $DISTRIBUTED_1, DISTRIBUTED_2, \ldots, DISTRIBUTED_N$). For example, the historical activities (e.g., responding to device prompts to resolve ambiguities, user interaction during teaching, . . . ) described herein can initially be stored local to the interaction location, such as in a portable wireless device (PWD) (not shown) that facilitates speech translation between the user and the FLS at the locale. This can be represented by a first distributed datastore 704 being part of the PWD and storing and data that is passed to it. Eventually, the updated contents thereof can be uploaded to a central datastore 706 which can be a regional datastore. One significance of this is that when the first user travels in a foreign country that utilizes the datastore system 700, travel among popular areas that contain the other distributed datastores 702 facilitates the upload of first user data as recorded by context interaction at those other locations. This also facilitates the use of other user interaction data that was stored at those locations before the first user arrived, to further enhance the translation experience of the first user at those locations.

Figure 8:
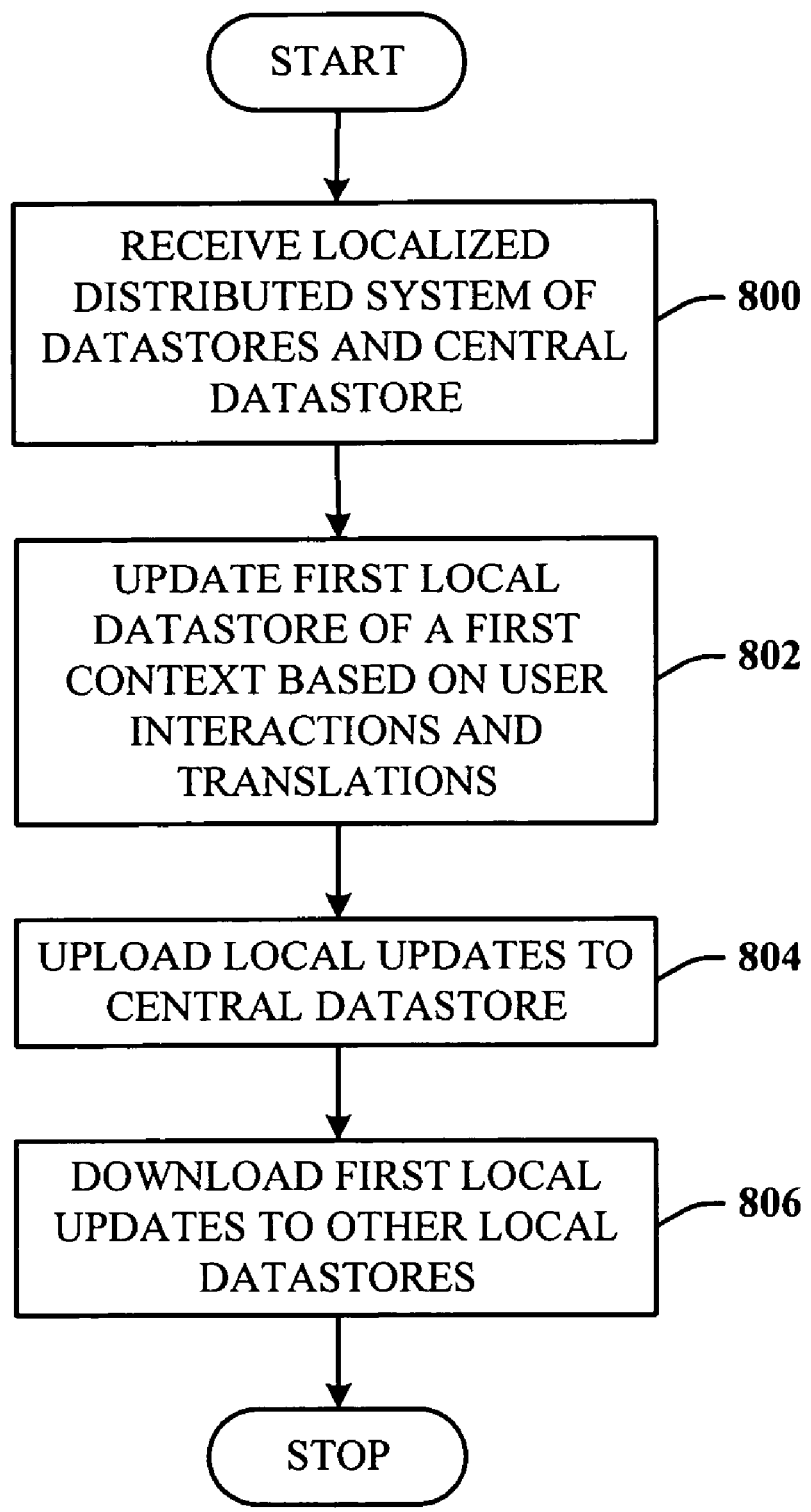
FIG. 8 illustrates a methodology of synchronizing distributed and central database in accordance with speech translation processing of the subject innovation.

FIG. 8 illustrates a methodology of synchronizing distributed and central database in accordance with speech translation processing of the subject innovation. At 800, a localized distributed system and a central system of datastores is received. At 802, a first local distributed datastore is updated with user data based on user actions at that location. This can include speech, locations visited, user actions at each location, and speech, gestures, and so on. At 804, user data is uploaded from the distributed datastore to the central datastore as the data is stored locally, and/or at a time when synchronization has minimal effect on system bandwidth. At 806, the central datastore synchronizes the updates to the other distributed datastores such that the user translation experience can be enhanced at those locations, if visited.

Figure 9:
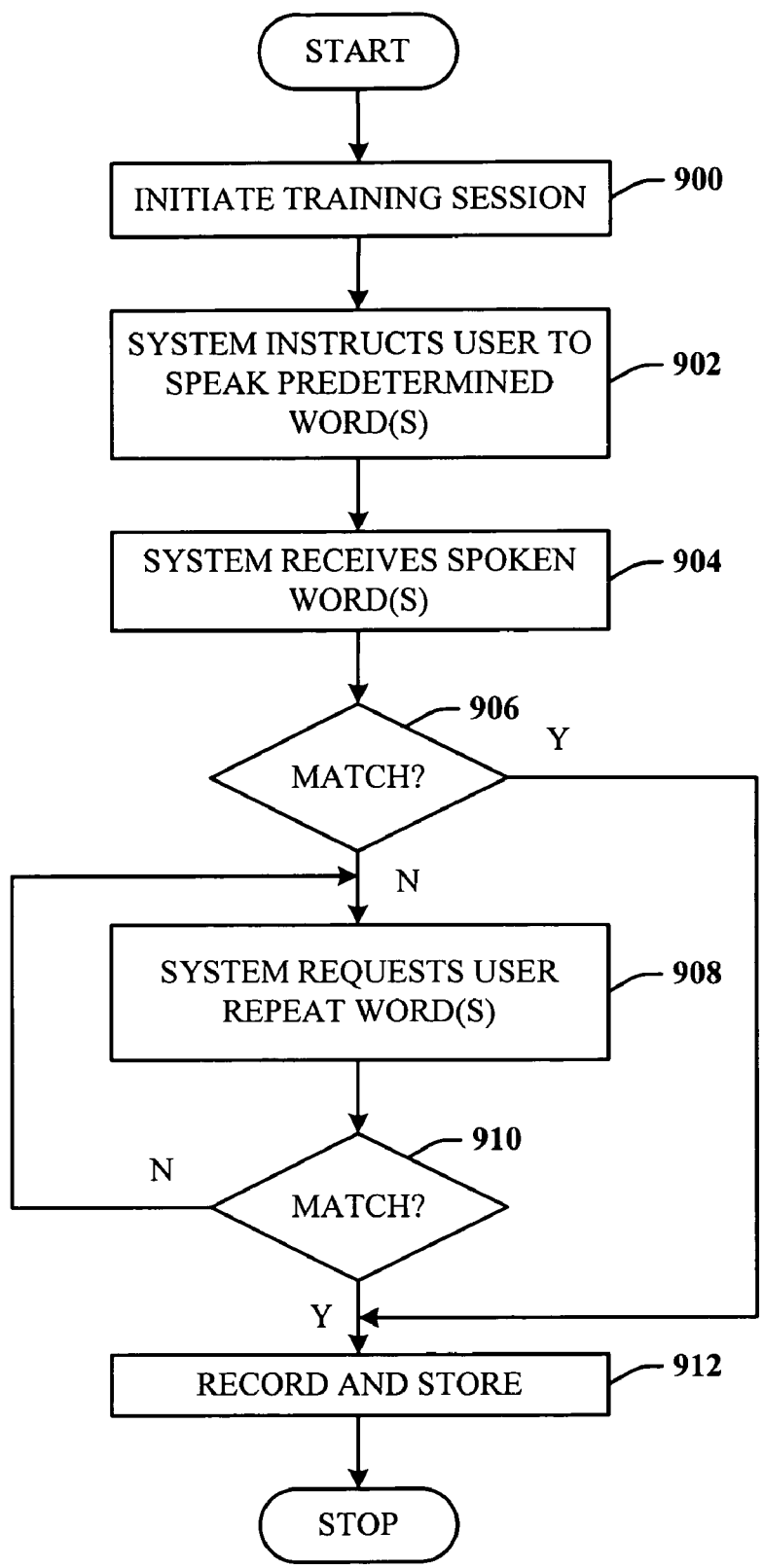
FIG. 9 illustrates a methodology of training the adaptive ASR for generation of a user phonemic model and a user language model.

FIG. 9 illustrates a methodology of training the adaptive ASR for generation of a user phonemic model and a user language model. At 900, the system and/or the user initiate a training session. At 902, the system instructs the user to speak a word or words. These can be selected by the system to capture many aspects that are deemed important by the system for resolving ambiguities, such as can occur due to user pronunciation, intonation, inflection, etc. At 904, the system receives the spoke word or words. At 906, the system processes the received words and determines if they match what the system previously instructed. If not, flow is to 908, where the system requests that the user to repeat the word or words. This can include the system interrupting the user as the requested words are being spoken. If the words match, as checked at 910, flow is to 912 where the system records and stores the user information, and updates phonemic and/or user language models. At 908, if there is a match, flow is to 912 to perform the storing and updating processes. If the second pronunciation by the user does not match, at 910, the system can repeat the process back to 908 until a satisfactory result is achieved, using other words or terms, for example, that achieve the same or similar results.

Figure 10:
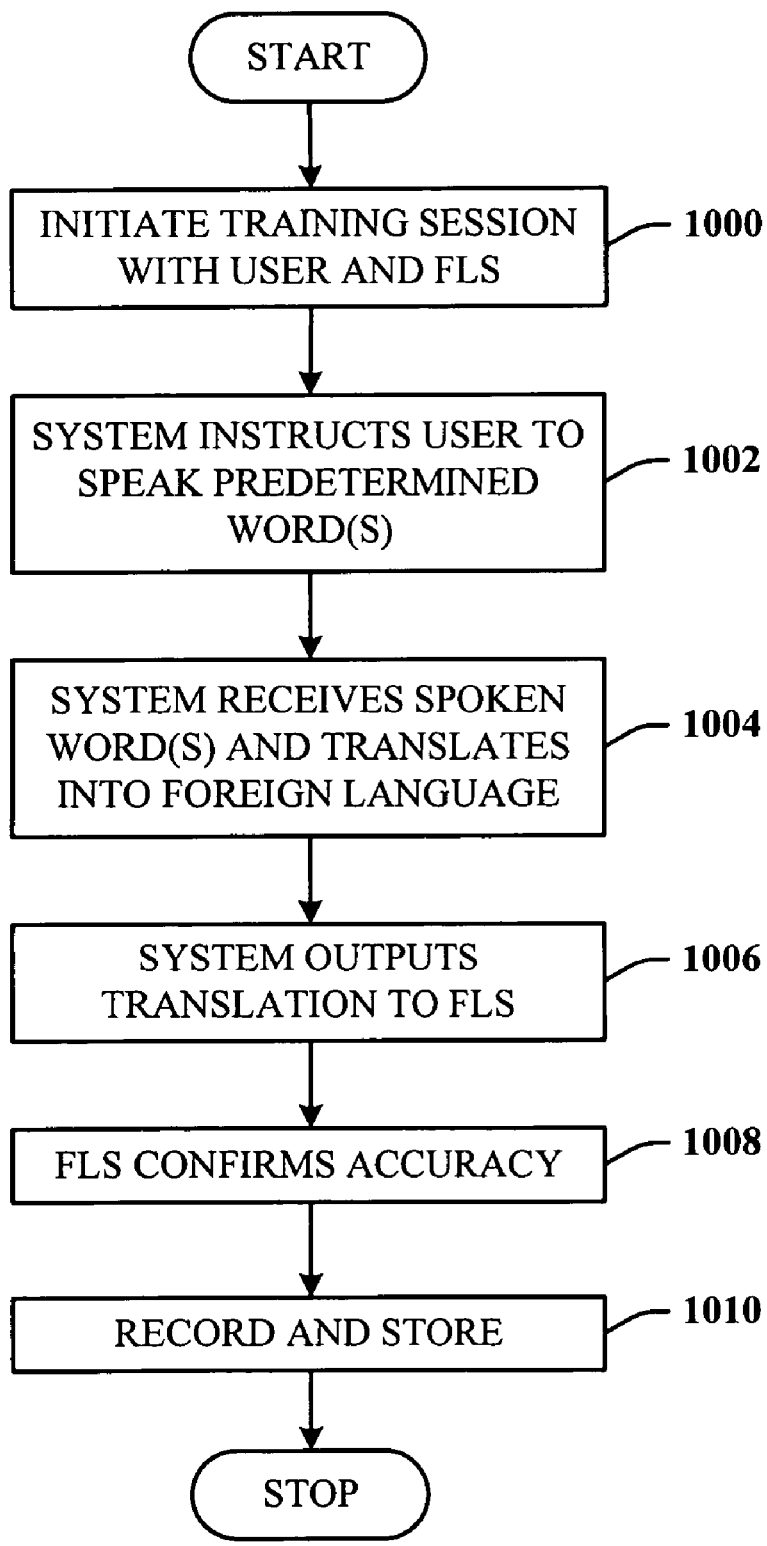
FIG. 10 illustrates a methodology of speech recognition training utilizing both the user and the FLS.

FIG. 10 illustrates a methodology of speech recognition training utilizing both the user and the FLS. At 1000, the training session is initiated in the presence of the user and the FLS. This can be system initiated or user initiated. At 1002, the system instructs the user to speak one or more predetermined words and/or sentences. At 1004, the system processes the spoken words and/or sentences, and translates them into the language of the FLS. At 1006, the system outputs the translated data to the FLS. This can be in machine-spoken signals, presentation on a display as text, and/or both audio and text. At 1008, the FLS provides feedback to confirm accuracy of the words and/or sentences. At 1010, in any case, data associated with the training session is stored for analysis and adaptive updating of the ASR for future speech translations.

Figure 11:
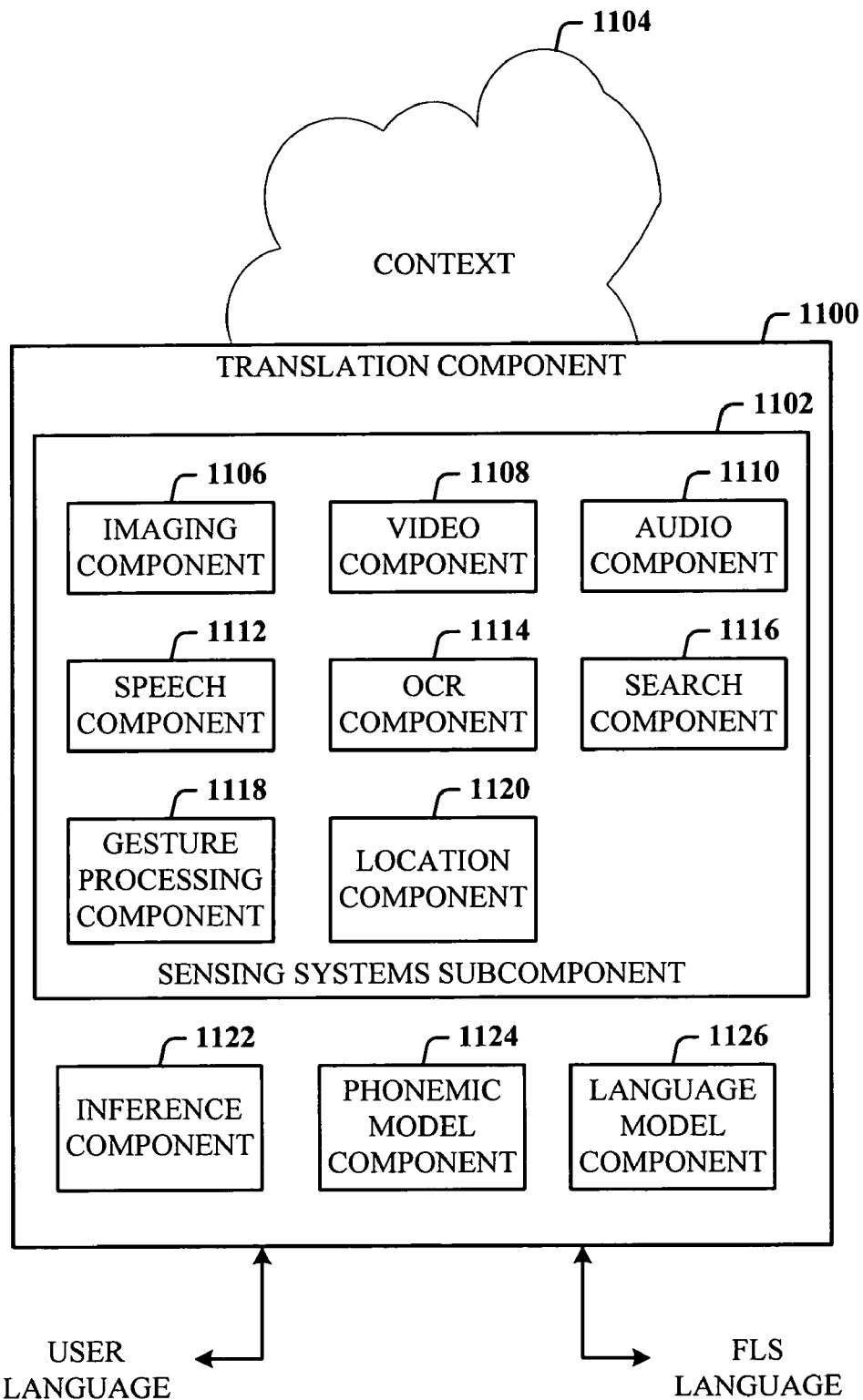
FIG. 11 illustrates a schematic block diagram of an exemplary translation component 1100 that facilitates translation between at least two users of different tongues.

FIG. 11 illustrates a schematic block diagram of an exemplary translation component 1100 that facilitates translation between at least two users of different tongues. The translation component 1100 includes sensing system subcomponents 1102 that facilitate enablement of sensing, capturing, and processing sensed input data representative of at least a user context 1104 and/or user concept. In support thereof, the translation component 1100 includes the sensing systems subcomponent 1102 (or modalities) that generally represent a plurality of different sensing subsystems for collecting information about the user context and/or user concept. For example, an imaging component (or subsystem) 1106 (e.g., a camera or imager) can be employed for taking picture snapshots of a menu (for content), a road sign, or any other item that can provide a clue as to the user concept and/or context 1104. A video component 1108 (e.g., a video camera) facilitates the capture of video clips of the context 1104. Thereafter, video processing can be employed to provide a clue as to the user concept and/or context 1104. An audio component 1110 (e.g., a microphone and accompanying electronics) facilitates the recording of audio data that can be native to the particular context 1104.

A speech component 1112 processes speech input of the user or others for recognition. Thus, this component 1112 can also include a library of language components (not shown) that facilitate recognition of the input speech language. Such speech can be converted into text with/without errors. An optical recognition component (OCR) 1114 processes imaged text captured by the image component 1106 and the video component 1108, for example. As indicated supra, the user can enhance translation accuracy by capturing a variety of data for clues as to context and content. In one example, the user can take a snapshot of a road sign, business sign, menu, the text of which can then be processed to improve the translation success for understandable output.

The sensing subsystems 1102 can also include a search component 1116 that can be activated manually or automatically to perform searches for data related to contextual and/or content information. The search can be a local search of data stored in a local datastore (not shown). Alternatively, or in combination therewith, the search can be conducted over a wireless and/or wired regime (e.g., the Internet) utilizing network search engines. In any case, the search component 1116 can receive search terms for query from any of the components of the sensing subsystems 1102. In another implementation, the search terms can be generated from another subsystem (not shown) that receives and processes the output data from select ones of the sensing subsystems 1102.

The sensing subsystems 1102 can also include a gesture component 1118 that facilitates the processing of user gestures as captured by the imaging component 1106 and/or the video component 1108. Gesture recognition can be utilized to enhance input recognition, urgency, and/or emotional interaction, for example. A location component 1120 facilitates determination of the geographic location of the user. This component 1120 can include a global positioning system (GPS) technology, and/or other suitable triangulation technology, such as IEEE 802.11, Wi-Fi signals, as well as such contextual information as whether the device is in motion (sensed via accelerometers or GPS), the ambient temperature near the device, whether conversation is detected, whether other people are recognized or identified via one or more technologies, and so on. Alternatively, the location component 1120 can function in cooperation with one or more of the other sensing subsystems 1102 to derive the user location. For example, based on image processing of the imaging component 1106, OCR output of the OCR component 1114, and results of the search component 1116, it can be deduced with some degree of success that the location is X.

The translation component 1100 can also include an inference component 1122 that processes sensed data from the sensing systems 1102 to derive possible clues and to develop and generate an inference about the user concept and/or context 1104. The translation component 1100 can also include a phonemic model component 1124 that stores and updates user and/or FLS speech characteristics during language exchanges. Additionally, a user language model component 1126 is generated that is personal to the user, and which defines the user language for any given situation and/or location. Ultimately, the translation component 1100 facilitates the understandable translation of words, terms, phrases and/or sentences between the user and the FLS.

Figure 12:
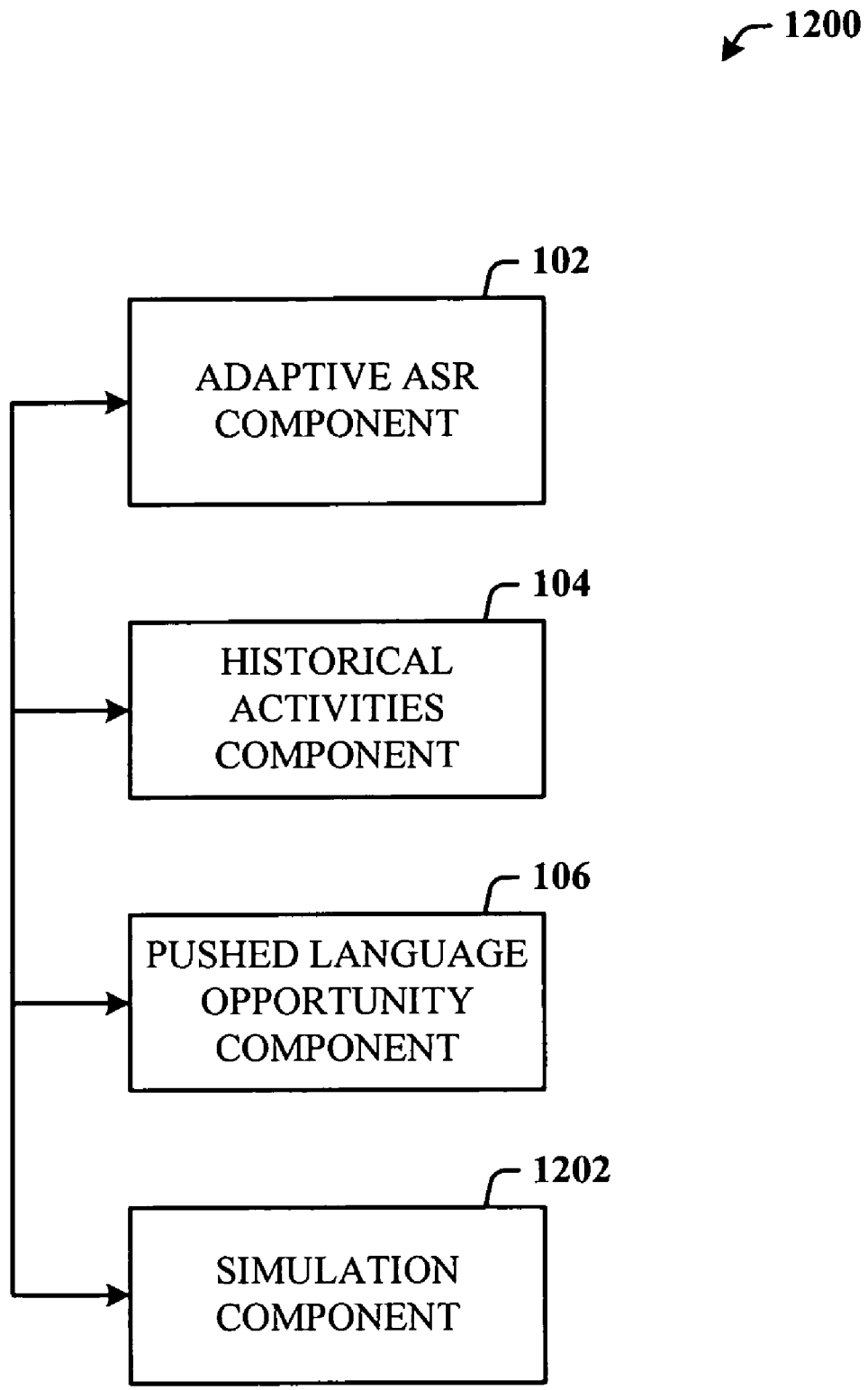
FIG. 12 illustrates a system that employs simulator teaching in accordance with another aspect.

Referring now to FIG. 12, there is illustrated a system 1200 that employs simulator teaching in accordance with another aspect. The architecture, in another innovative aspect, can employ a simulation component 1202 that provides for user teaching of a foreign language. The simulation component 1202 can interface and work in combination with any of the adaptive ASR component 102, the historical activities component 104, and the pushed language opportunity component 106. The simulation component 1202 operates to prompt the user in the user language to speak the prompted terms, words, phrases, and/or sentences in a foreign language, in response to which the user voices the corresponding translation in the foreign language. The system 1200 then processes the user response, and can suggest changes in intonation, word usage, sentence structure, etc., as part of the user educational process.

This is just one example of many different scenarios in which user training can be performed. For example, the simulation component 1202 can prompt the user in the foreign language in response to which the user provides the translation in the user language. In another example, the simulation component 1202 prompts the user to repeat the terms, phrases, and/or sentences in the foreign language, as output by the system, in response to which the user speaks the same terms, phrases, and/or sentences in the foreign language. The system 1200 then analyzes the user speech, and offers corrections in the form of intonation, emphasis, inflections, etc., that better mirror the proper spoken foreign language. Such teaching data can then be stored on the historical datastore, and used to further develop the user phonemic and language models, and for future translation exchanges by the user.

Figure 13:
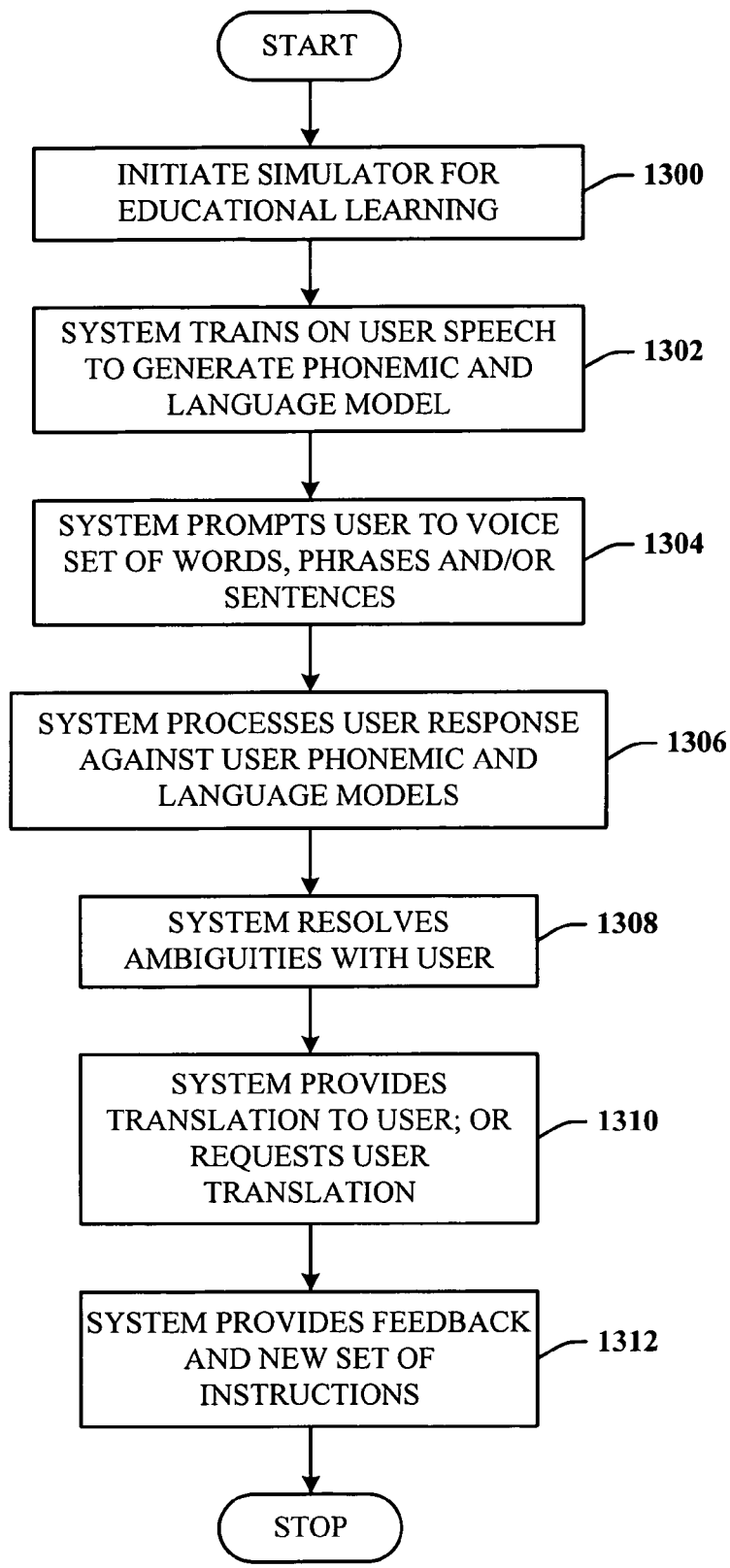
FIG. 13 illustrates a methodology of teaching a user a foreign language in accordance with another aspect.

FIG. 13 illustrates a methodology of teaching a user a foreign language in accordance with another aspect. At 1300, the simulator training is initiated. This can be manually initiated by the user, or automatically by the system. At 1302, if a first-time user, the system trains itself to learn user speech characteristics and develop personalized user phonemic and language models. At 1304, the system prompts the user to voice a word, set of words, a phrase, and/or sentence(s). At 1306, the system receives and processes the user response at least against the user phonemic and languages models. At 1308, the system computes any errors, ambiguities and inaccuracies and resolves these with back-and-forth speech recognition with the user. At 1310, in one user learning session, the system provides to the user the translation for user perception (e.g., via machine-spoken signals, textual display, and/or both). In another learning session, the system requests that the user reply with a corresponding foreign translation. At 1312, the system provides feedback to the user as to the accuracy of the user translation.

Figure 14:
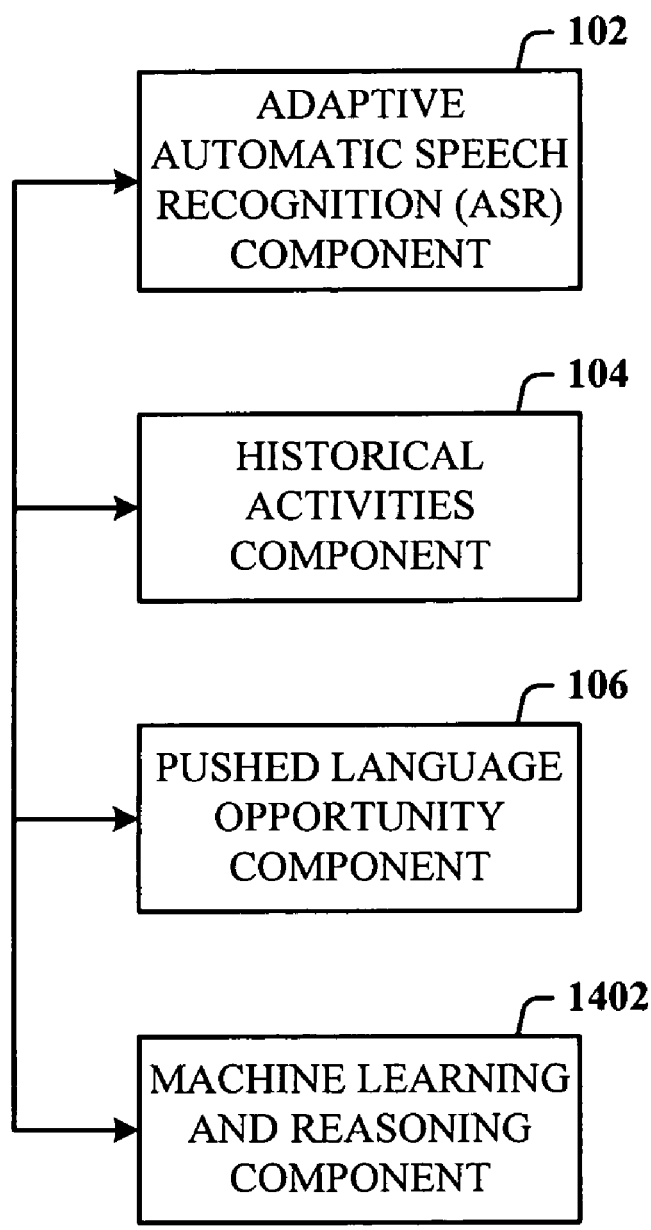
FIG. 14 illustrates a system that employs a machine learning and reasoning component which facilitates automating one or more features in accordance with the subject innovation.

FIG. 14 illustrates a system 1400 that employs a machine learning and reasoning (MLR) component 1402 which facilitates automating one or more features in accordance with the subject innovation. The subject invention (e.g., in connection with selection) can employ various artificial intelligence-based schemes for carrying out various aspects thereof. For example, a process for determining which terms, sets of terms, phrases, and/or sentences to use in system and/or user training can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions.

By way of interfacing to the adaptive ASR component 102, the historical activities component 104 and the pushed opportunity language component 106, automatic learning and performance can include, but is not limited to, determining according to a predetermined criteria when a user-voiced word or term is deemed accurate or unambiguous. In another example, the MLR component 1402 can facilitate determination of how many iterations should be employed with a given user to reach the desired level of accuracy of the spoken foreign language. These are only but a few of the many features that can be learned and automatically performed via the MLR component 1402.

Figure 15:
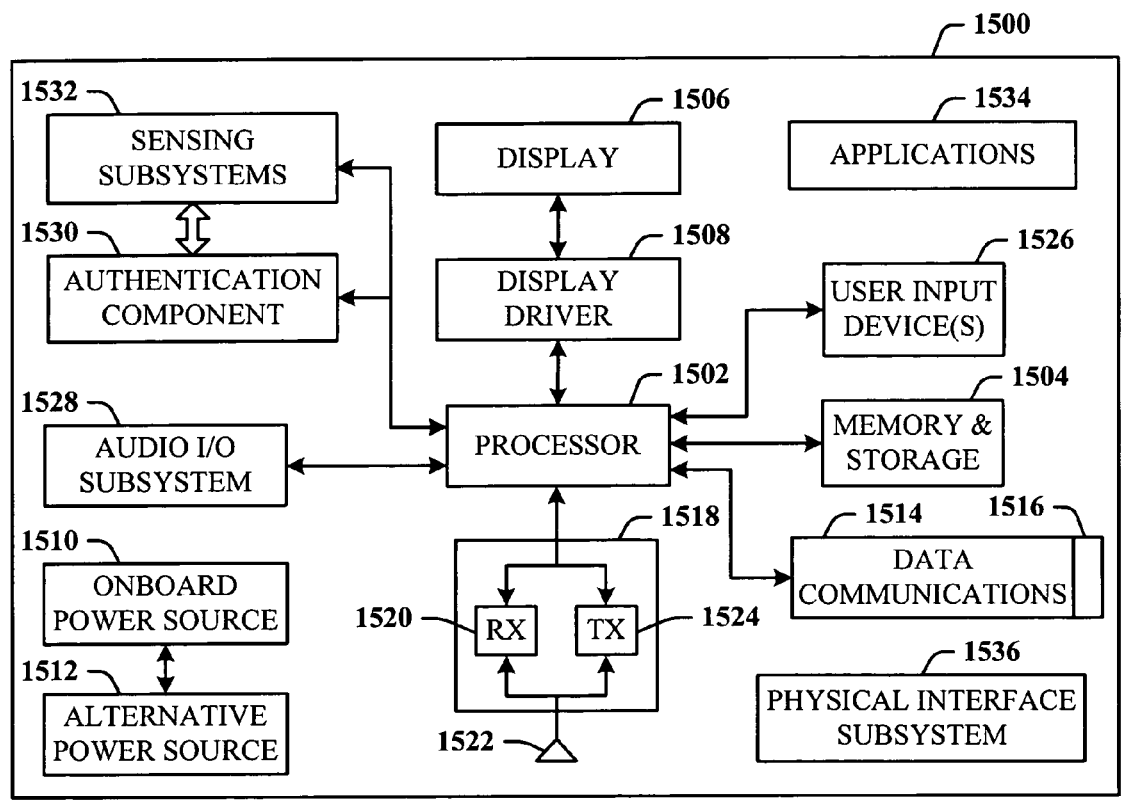
FIG. 15 illustrates a schematic block diagram of a portable wireless device that facilitates translation according to an aspect of the subject innovation.

FIG. 15 illustrates a schematic block diagram of a PWD 1500 (e.g., a cell phone) that facilitates translation according to an aspect of the subject innovation. The device 1500 includes a processor 1502 that interfaces to one or more internal components for control and processing of data and instructions. The processor 1502 can be programmed to control and operate the various components within the device 1500 in order to carry out the various functions described herein. The processor 1502 can be any of a plurality of suitable processors (e.g., a DSP-digital signal processor), and can be a multiprocessor subsystem.

A memory and storage component 1504 interfaces to the processor 1502 and serves to store program code, and also serves as a storage means for information such as data, applications, services, metadata, device states, and the like. The memory and storage component 1504 can include non-volatile memory suitably adapted to store at least a complete set of the sensed input data that is acquired from the sensing subsystem and/or sensors. Thus, the memory 1504 can include RAM or flash memory for high-speed access by the processor 1502 and/or a mass storage memory, e.g., a micro drive capable of storing gigabytes of data that comprises text, images, audio, and/or video content. According to one aspect, the memory 1504 has sufficient storage capacity to store multiple sets of information relating to disparate services, and the processor 1502 can include a program that facilitates alternating or cycling between various sets of information corresponding to the disparate services.

A display 1506 can be coupled to the processor 1502 via a display driver subsystem 1508. The display 1506 can be a color liquid crystal display (LCD), plasma display, touch screen display, or the like. The display 1506 functions to present data, graphics, or other information content. Additionally, the display 1506 can present a variety of functions that are user selectable and that provide control and configuration of the device 1500. In a touch screen example, the display 1506 can display touch selectable icons that facilitate user interaction for control and/or configuration.

Power can be provided to the processor 1502 and other onboard components forming the device 1500 by an onboard power system 1510 (e.g., a battery pack or fuel cell). In the event that the power system 1510 fails or becomes disconnected from the device 1500, an alternative power source 1512 can be employed to provide power to the processor 1502 and other components (e.g., sensors, image capture device, . . . ) and to charge the onboard power system 1510, if a chargeable technology. For example, the alternative power source 1512 can facilitate interface to an external a grid connection via a power converter. The processor 1502 can be configured to provide power management services to, for example, induce a sleep mode that reduces the current draw, or to initiate an orderly shutdown of the device 1500 upon detection of an anticipated power failure.

The device 1500 includes a data communications subsystem 1514 having a data communications port 1516, which port 1516 is employed to interface the device 1500 to a remote computing system, server, service, or the like. The port 1516 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 1514 can include SIM (subscriber identity module) data and the information necessary for cellular registration and network communications.

The device 1500 can also include a radio frequency (RF) transceiver section 1518 in operative communication with the processor 1502. The RF section 1518 includes an RF receiver 1520, which receives RF signals from a remote device or system via an antenna 1522 and can demodulate the signal to obtain digital information modulated therein. The RF section 1518 also includes an RF transmitter 1524 for transmitting information (e.g., data, service(s)) to a remote device or system, for example, in response to manual user input via a user input device 1526 (e.g., a keypad), or automatically in response to detection of entering and/or anticipation of leaving a communication range or other predetermined and programmed criteria.

The device 1500 can also include an audio I/O subsystem 1528 that is controlled by the processor 1502 and processes voice input from a microphone or similar audio input device (not shown). The audio subsystem 1528 also facilitates the presentation of speech and audio output signals via a speaker or similar audio output device (not shown).

The device 1500 can also include an authentication component 1530 that interfaces to the processor, and facilitates authentication of a user to the device itself and/or to a remote system. The processor 1502 also interfaces to a sensing subsystems block 1532 that facilitates the capture and input of the OCR data, voice data, handwriting data, and image/video data, for example, for determination of user context and/or concept. Additionally, the device 1500 includes one or more applications 1534 (e.g., imaging program, video presentation program, OCR program, search engine, . . . ) that can be launched to enable operation of the sensing systems for receiving sensed input data in accordance with the innovative architecture. The applications can also includes programs for phonemic and language model creation and updating, and inference analysis and selection.

The device 1500 can also include a physical interface subsystem 1536 that allows direct physical connection to another system (e.g., via a connector), rather than by wireless communications or cabled communications therebetween.

Figure 16:
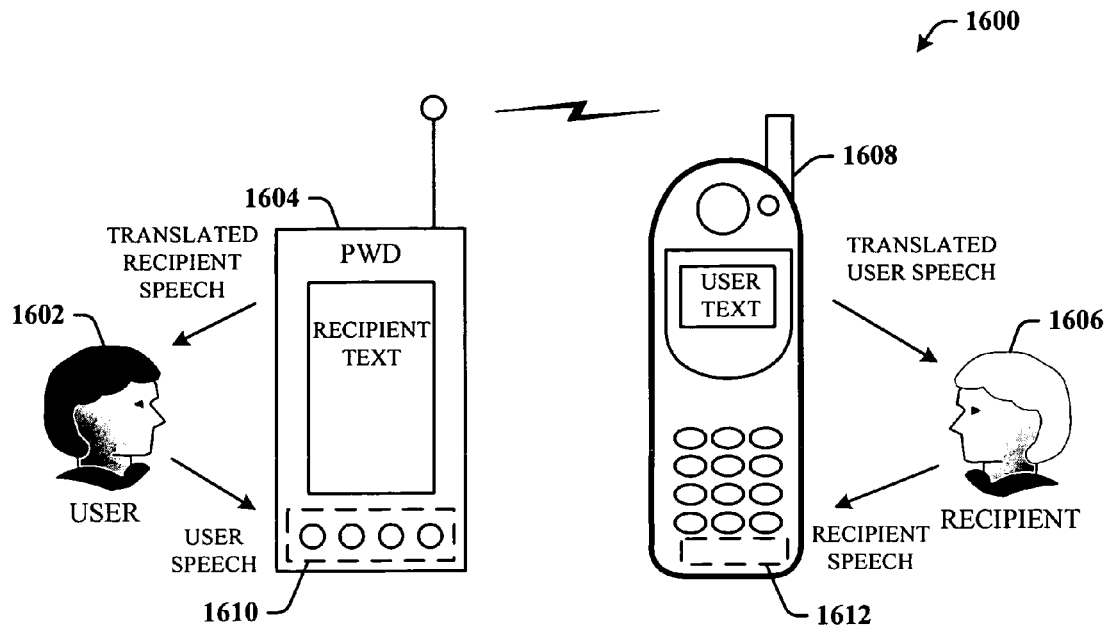
FIG. 16 illustrates a device-to-device translation system between a user and a FLS recipient according to an aspect.

FIG. 16 illustrates a device-to-device translation system 1600 between a user and a FLS recipient according to an aspect. A user 1602 utilizes a portable wireless device (PWD) 1604 (which includes the translation architecture of the subject innovation) to communicate wirelessly with the FLS recipient 1606 via a recipient device 1608 (which also includes the translation architecture of the subject innovation). The user 1602 inputs speech signals to the user PWD 1604, which are then processed into translated output and communicated wirelessly to the recipient device 1608. The recipient device 1608 translates the user speech into user text, which can be displayed on the recipient device 1608, and/or output as translated user speech to the recipient 1606. Similarly, the user device 1604 translates the recipient speech into recipient text, which can be displayed on the user device 1604, and/or output as translated recipient speech to the user 1602.

If both the user 1602 and the recipient 1606 are located in the nearly the same context, either or both devices 1604 or/and 1608 can perform the context and/or concept processing described supra, to enhance translation. Thus, the modalities 1610 and 1612 of either or both devices 1604 or/and 1608, respectively, can be employed to generated the desired translations.

Figure 17:
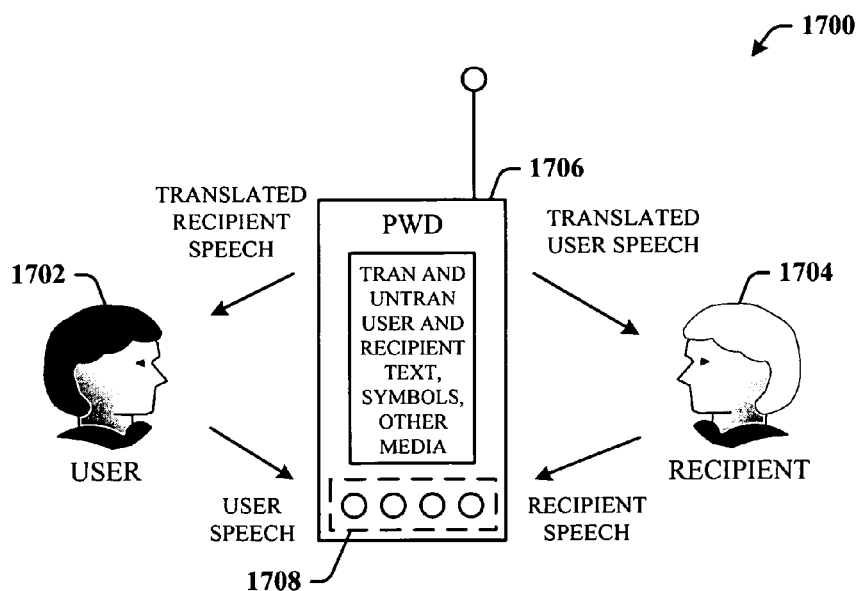
FIG. 17 illustrates a single device translation system that can be utilized between a user and an FLS according to another innovative aspect.

FIG. 17 illustrates a single device translation system 1700 that can be utilized between a user and an FLS according to another innovative aspect. A user 1702 and an FLS recipient 1704 are face-to-face, for example, but cannot communicate effectively. The user speaks into the device 1706, which then processes the user speech into text, symbols, and/or other media (e.g., images, sounds, videos, . . . ) that can be interpreted and understood by the recipient 1704. The text, symbols, and/or other media can be displayed on the device 1706, the text in both the user language and the recipient language. The use of non-text media (e.g., symbols, images, sounds, videos) can be employed where the recipient is illiterate, for example. It is to be understood in the context of the subject innovation that whenever text or speech is used in an example of the description, that this can also include symbols and/or other media that can be output or communicated in some form between the parties, as well. Alternatively, or in combination therewith, the user speech can be presented to the recipient 1704 as translated user speech. Similarly, the device 1704 translates the recipient speech into recipient text, which can be displayed on the device 1704, and/or output as translated recipient speech to the user 1702. The device 1706 also includes modalities in the form of sensing components 1708 one or more of which can be provided in the device 1704 to facilitate improved translation in accordance with an innovative aspect.

Figure 18:
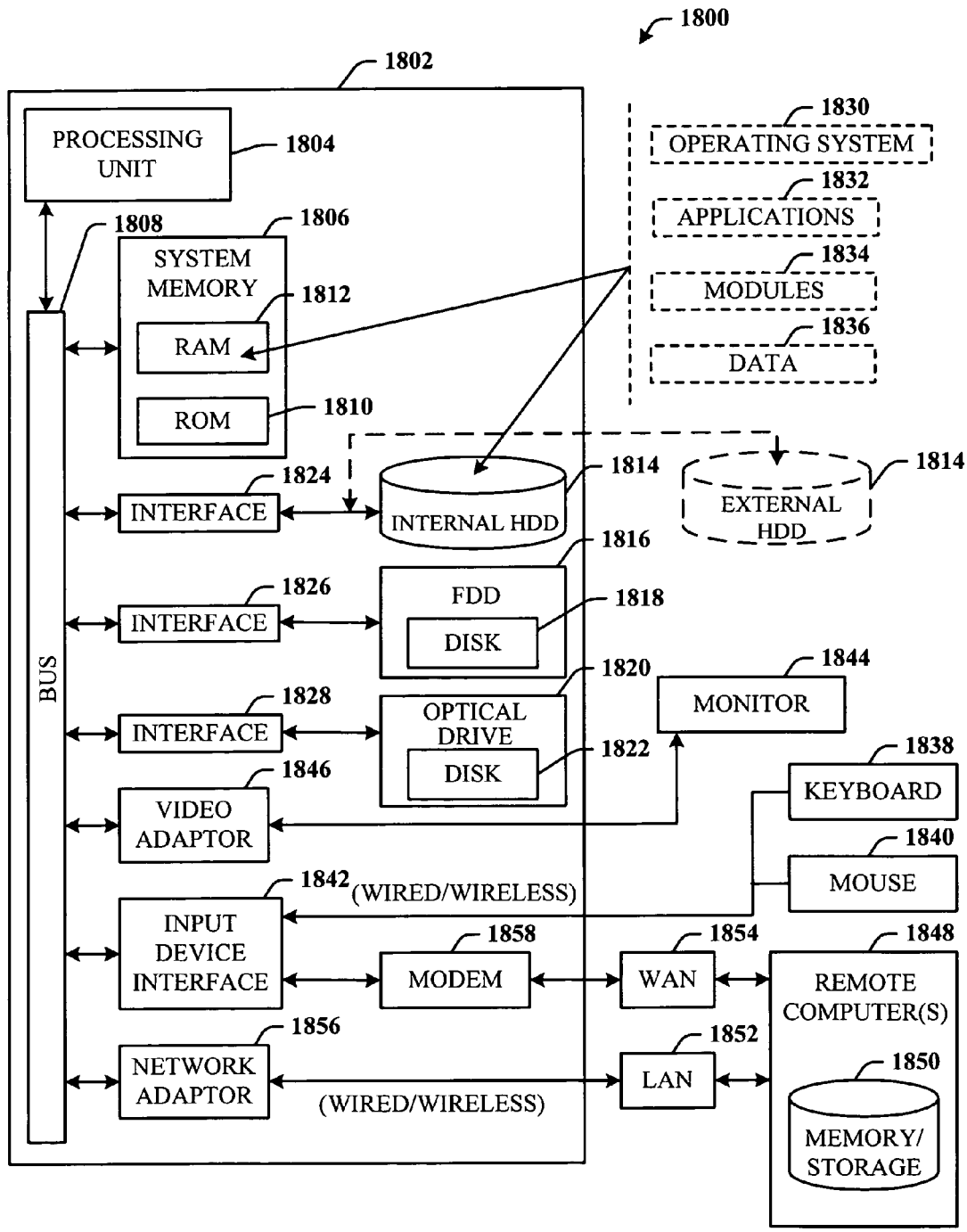
FIG. 18 illustrates a block diagram of a computer operable to execute the disclosed translation architecture.

Referring now to FIG. 18, there is illustrated a block diagram of a computer operable to execute the disclosed translation architecture. Additionally, the computer can serve as a local distributed datastore and/or the central datastore system described supra. In order to provide additional context for various aspects thereof, FIG. 18 and the following discussion are intended to provide a brief, general description of a suitable computing environment 1800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 18, the exemplary environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the innovation can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 19:
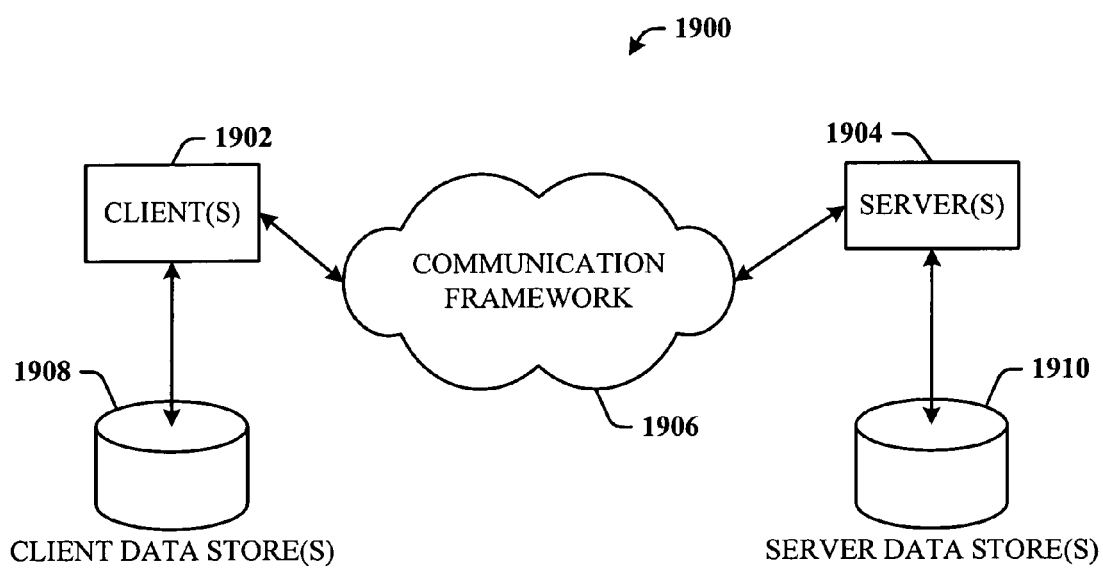
FIG. 19 illustrates a schematic block diagram of an exemplary computing environment that facilitates speech translation in accordance with another aspect.

Referring now to FIG. 19, there is illustrated a schematic block diagram of an exemplary computing environment 1900 that facilitates speech translation in accordance with another aspect. The system 1900 includes one or more client(s) 1902 (e.g., PWD for speech input and output). The client(s) 1902 can be hardware and/or software (e.g., threads, processes, computing devices). The client(s) 1902 can house cookie(s) and/or associated contextual information by employing the subject innovation, for example.

The system 1900 also includes one or more server(s) 1904 (e.g., the local distributed datastore servers and/or the central datastore server). The server(s) 1904 can also be hardware and/or software (e.g., threads, processes, computing devices). The servers 1904 can house threads to perform transformations by employing the invention, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates speech translation, comprising:
  a processor;
  a speech recognition component operated by the processor that processes sensed data of a current context and facilitates a speech recognition process based on the sensed data;
  a historical activities component operated by the processor that stores historical data associated with the speech recognition process;
  a language model operated by the processor that is created to recognize speech of the user and which is updated based on interactions with a user and on responses of a foreign language speakers, wherein the foreign language speaker is a person being addressed and provides the responses via a backchannel between the system and a device of the foreign language speaker; and
  a language opportunity component operated by the processor that improves the speech recognition process by pushing a training session of one or more terms to the user which increases likelihood of success when using the one or more terms during the speech recognition process.

2. The system of claim 1, further comprising a sensing system that includes at least one of a microphone, an image capture subsystem, and a location subsystem, and outputs the sensed data representative thereof.

3. The system of claim 1, further comprising an opportunity component that pushes a request to the user to resolve an ambiguity.

4. The system of claim 1, further comprising a phonemic module that understands the user based on the language model.

5. The system of claim 1, further comprising a simulator component utilized for training a user how to speak a foreign language.

6. The system of claim 5, wherein the simulator component prompts the user in a user language and outputs corresponding foreign translation.

7. The system of claim 1, wherein the historical activities component includes at least one of a central datastore of user data and a localized datastore of local user data.

8. The system of claim 1, wherein the speech recognition component is automatic and adaptive.

9. The system of claim 1, further comprising a machine learning and reasoning component that employs a probabilistic and/or statistical-based analysis to prognose or infer an action that a user desires to be automatically performed.

10. A method of facilitating the translation of speech between users of different tongues, comprising:
    receiving, by a computing device, speech signals of a user and other inputs during a speech recognition process;
    computing, by the computing device, an inference of a user context based on analysis of the speech signals and the other input, wherein the user context includes at least one of an image, location information, gesture information, and search information;
    modifying, by the computing device, the speech recognition process according to the inference;
    interacting, by the computing device, with the user to resolve ambiguous speech;
    presenting, by the computing device, translated speech to a foreign language speaker by sending the translated speech to a device of the foreign language speaker;
    modifying, by the computing device, the speech recognition process based on the interacting with the user and on a response from the foreign language speaker, wherein the foreign language speaker provides the response via a backchannel between the computing device and the device of the foreign language speaker; and
    updating, by the computing device, at least one of a user phonemic model and a user language model based on the act of interacting.

11. The method of claim 10, further comprising an act of generating at least one of the user phonemic model and the user language model based on the act of interacting.

12. The method of claim 10, wherein the act of interacting includes an act of responding with user feedback via at least one of speech and mechanical interaction to resolve the ambiguous speech.

13. The method of claim 10, further comprising an act of revising the inference by processing sensed input data in addition to the speech signals.

14. A system that facilitates communication between users of different tongues, comprising:
    a processor;
    means operable by the processor for receiving speech signals of at least one of a user and other input during a speech recognition process;
    means operable by the processor for computing an inference of a user context based on analysis of the speech signals and the other input, wherein the user context includes at least one of an image, location information, gesture information, and search information;
    means operable by the processor for interacting with the at least one of a user to resolve ambiguous speech;
    means operable by the processor for modifying the speech recognition process according the inference;
    means operable by the processor for presenting translated speech to a foreign language speaker by sending the translated speech to a device of the foreign language speaker;
    means operable by the processor for modifying the speech recognition process based on the interacting with the user and on a response from the foreign language speaker, wherein the foreign language speaker provides the response via a backchannel between the system and the device of the foreign language speaker; and
    means operable by the processor for updating at least one of a user phonemic model and a user language model based on the act of interacting.

15. The system of claim 14, further comprising means for storing at least one of user interaction data and foreign language speaker interaction data at a local distributed datastore.

* * * * *